United States Patent [19]

Colegrove

[11] Patent Number: 5,805,857
[45] Date of Patent: Sep. 8, 1998

[54] DASD CAPACITY IN EXCESS OF 528 MEGABYTES APPARATUS AND METHOD FOR PERSONAL COMPUTERS

[75] Inventor: Daniel James Colegrove, Rochester, Minn.

[73] Assignee: International Business Machines Corporation, Armonk, N.Y.

[21] Appl. No.: 224,846

[22] Filed: Apr. 7, 1994

[51] Int. Cl.$^6$ .............................. G06F 9/00; G06F 13/12
[52] U.S. Cl. ...................... 395/500; 395/404; 395/439; 364/939; 364/955; 364/955.5
[58] Field of Search ................................. 395/500, 425, 395/404, 430, 401; 364/926.9, 926.93, 927.92, 927.99, 926.92, 939, 955, 955.5

[56] References Cited

U.S. PATENT DOCUMENTS

| | | | |
|---|---|---|---|
| 4,215,400 | 7/1980 | Denko | 395/404 |
| 4,223,390 | 9/1980 | Bowers et al. | 395/182.03 |
| 4,467,421 | 4/1984 | White | 395/445 |
| 4,583,194 | 4/1986 | Cage | 364/419.18 |
| 4,591,997 | 5/1986 | Grabel | 364/519 |
| 5,018,095 | 5/1991 | Nissimov | 395/404 |
| 5,043,885 | 8/1991 | Robinson | 395/460 |
| 5,072,378 | 12/1991 | Manka | 395/575 |
| 5,247,633 | 9/1993 | Nissomov et al. | 395/425 |
| 5,263,145 | 11/1993 | Brady et al. | 395/425 |
| 5,280,602 | 1/1994 | Holt | 395/425 |
| 5,309,451 | 5/1994 | Noya et al. | 371/40.4 |
| 5,465,338 | 11/1985 | Clay | 395/325 |

FOREIGN PATENT DOCUMENTS

| | | | |
|---|---|---|---|
| 0 467 520 A2 | 1/1992 | European Pat. Off. | G06F 3/06 |

OTHER PUBLICATIONS

Electronics, v.67 n.6, 28 Mar. 1994, p. 9 "MS–DOS Disk Storage Limit Overcome".

*Primary Examiner*—Kevin J. Teska
*Assistant Examiner*—Thai Phan
*Attorney, Agent, or Firm*—Daniel E. McConnell

[57] ABSTRACT

This disclosure relates to translating cylinder-head-sector (CHS) addressing of digital data written to or read from a DASD so as to accommodate DASD storage capacities in excess of the approximately five hundred twenty eight megabyte capacity limit imposed by Interrupt 13 design in an Industry Standard Architecture personal computer system. A CHS (cylinder-head-sector) address in a first frame of reference which meets the restraints of Interrupt 13 design in the ISA BIOS is translated to a CHS address in a second frame of reference which meets the physical characteristics of a DASD which is otherwise outside the restraints of Interrupt 13 design in the ISA BIOS. Determination of a conversion factor for translation of CHS addresses between the first and second frames of reference for cylinder and head numbers, conversion, and translation can occur as a function of the system BIOS in cooperation with the system CPU; as a function of a controller card BIOS in cooperation with a controller microprocessor; or as a function of an IDE BIOS in cooperation with an IDE microprocessor.

63 Claims, 8 Drawing Sheets

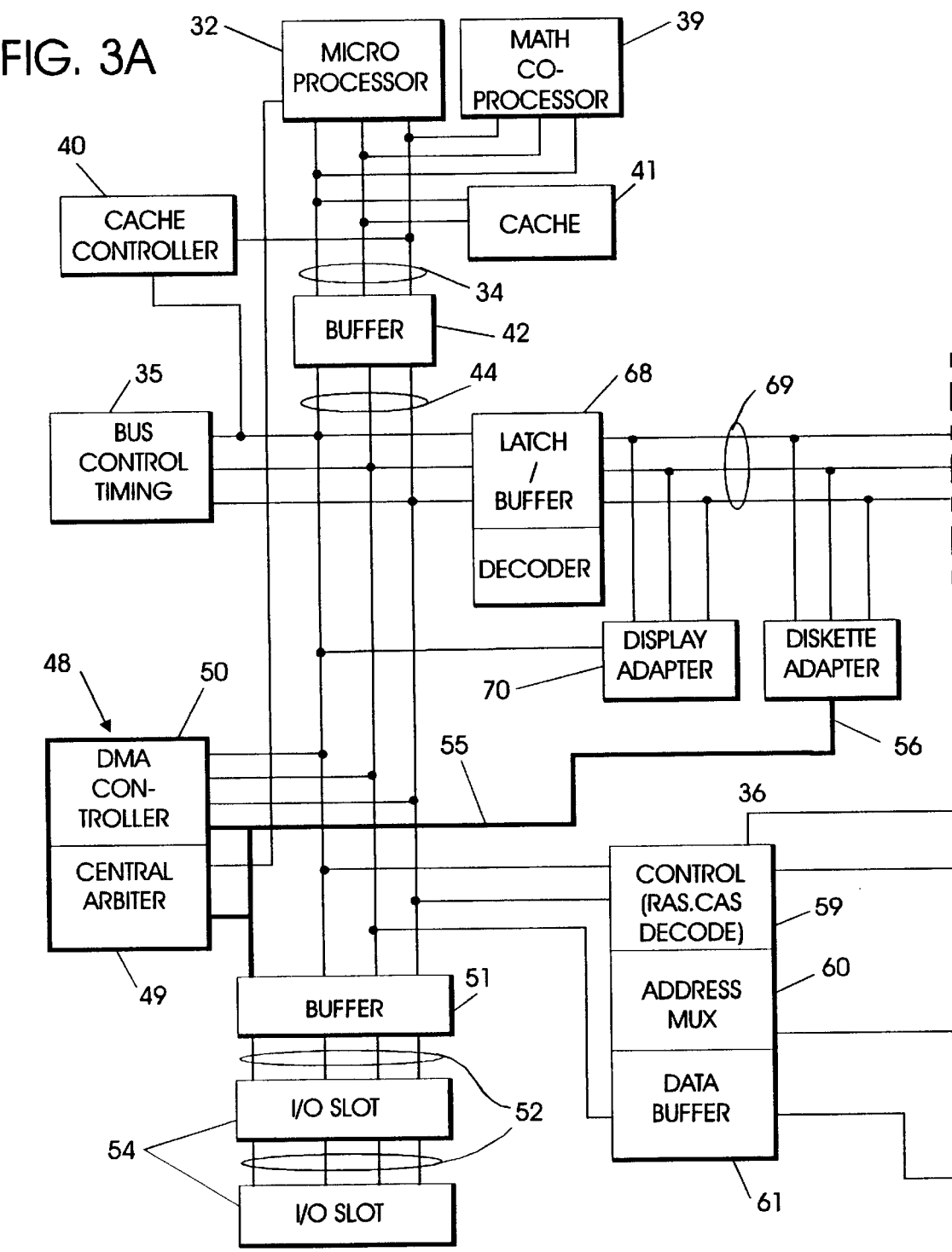

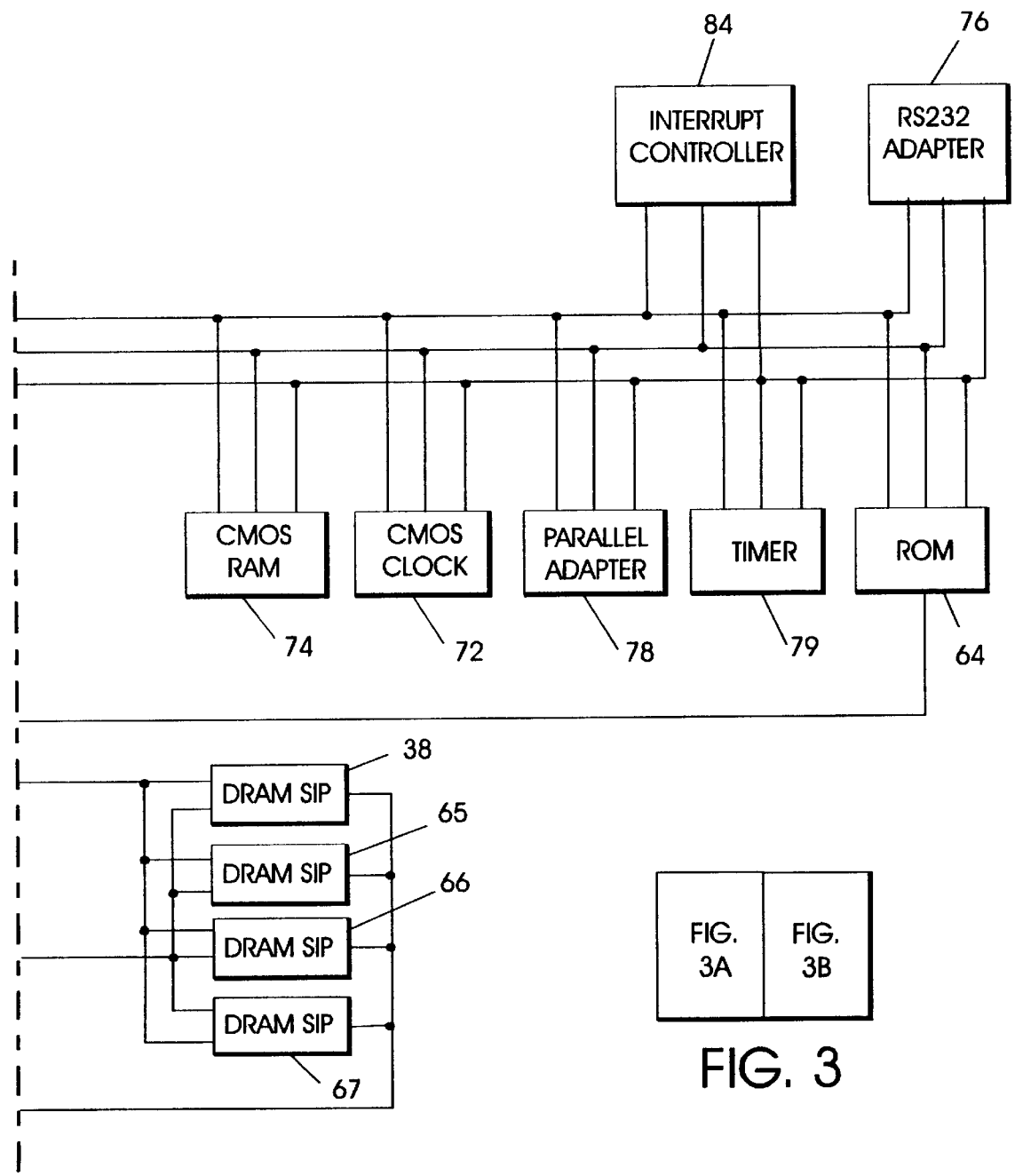

DASD CAPACITY IN EXCESS OF 528 MEGABYTES APPARATUS AND METHOD FOR PERSONAL COMPUTERS

BACKGROUND OF THE INVENTION

Personal computer systems in general and IBM personal computers in particular have attained widespread use for providing computational power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer or plotter. One of the distinguishing characteristics of these systems is the use of a motherboard or system planar to electrically connect many of these components together. These systems are designed primarily to give independent computing power to a single user and are inexpensively priced for purchase by individuals or small businesses. Examples of such personal computer systems are IBM's PERSONAL COMPUTER AT, PERSONAL SYSTEM/1, PERSONAL SYSTEM/2 and THINKPAD systems.

These systems can be classified into two general families. The first family, usually referred to as Family I Models, use a system and bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models originally used the INTEL 8088 or 8086 microprocessor as the system processor. These processors have the ability to address one megabyte of random access memory (also known as RAM, the non-volatile memory used as working memory in personal computer systems). The Family II models have used the high speed INTEL 80286, 80386, 80486, and Pentium microprocessors, which can operate in a real mode to emulate the slower speed INTEL 8086 microprocessor or a protected mode which extends the memory addressing range from 1 megabyte to 4 Gigabytes for some models. In essence, the real mode feature of the 80286, 80386, and 80486 processors provide hardware compatibility with software written for the 8086 and 8088 microprocessors.

"Family I" personal computer systems have also come to be known as "Industry Standard Architecture" or ISA systems, inasmuch as the design of such systems has come to be embodied in standards followed by large segments of the personal computer industry. Those standards have included certain operational calls used by control programs which enable functioning of the systems. Such control programs are often identified as "basic input/output systems" or BIOS, and ISA systems follow the BIOS design set forth in the IBM BIOS Technical Reference. For purposes of the present disclosure, an important portion of that Reference is that which pertains to Interrupt 13 operation, appearing at pages 2–58 and following in the referenced publication. Interrupt 13 sets forth the manner in which an ISA system will deal with addressing of fixed disk or direct access storage devices (also known as DASD) such as large storage capacity, fixed rotating magnetic (or other) media disk drives or hardfiles or harddisks. Such DASD are distinguished from "floppy" disk drives for which the magnetic (or other) media is removable rather than being fixed in place.

DASD used with ISA personal computer systems have come to be known also as "AT Attachable" or "ATA" drives. In systems of early design, such DASD typically are used in conjunction with a controller which is separate from the drive itself. Communication of digital data flowing between the DASD and the remainder of the computer system is governed by the controller, which in early design took the form of a card or board mounted in a connector (or "slot") provided for an input/output or I/O bus. (See *The Winn Rosch Hardware Bible*, Simon & Schuster, New York, 1989; pp 475 ff.) The controller is operated in such a manner as to address the location of digital data written to or read from the rotating disks of the DASD by track (also, and here, known as cylinder) and sector. Further, as DASD typically have a plurality of disks or plates stacked together and served by a plurality of heads, addressing is done by which head will access the desired cylinder portion or sector. Such addressing is known as cylinder-head-sector or CHS addressing.

Due to certain limitations of Interrupt 13 design, an ISA personal computer system expects to address one thousand twenty four cylinders and up to two hundred fifty six heads. However, DASD design does not always fit easily into such expectations. Instead, designers and manufacturers of DASD may provide a greater number of cylinders and some number of heads less than the maximum number contemplated by Interrupt 13 design. Typically, an ATA DASD will have sixteen heads. However, the limitation on cylinder addressing at one thousand twenty eight, and comparable inherent limitations of sector size at sixty three for each track and bytes per sector at five hundred twelve, limits the addressability of such a sixteen head ATA DASD to five hundred twenty eight million four hundred eighty two thousand three hundred four bytes of data (1024×16×63× 512).

As the design of ISA personal computer systems has progressed, there have come to be alternative ways of implementing DASD control. These have included Integrated Drive Electronics (also, and here, known as IDE) type devices in which the electronics which would otherwise be carried on a controller card is integrated into the DASD structure. This enables an IDE DASD to be installed apart from any separately provided controller card, thus saving a slot or connector to the I/O bus. Another alternative, used by some systems, has been to mount a controller for a DASD directly on the system motherboard or planar, similarly enabling a DASD to be installed apart from any separately provided controller card, thus saving a slot or connector to the I/O bus. Neither of these solutions solves the problem of using the prior CHS data in addressing more than 1024 cylinders in such drives.

As progress has been made in the mentioned areas of design, progress has likewise been made in the design and manufacture of DASD. As a result, drives have become available which have capacities in excess of the approximately 528 megabyte ceiling limitation. Thus it has become important to be able to satisfactorily address such drive capacities.

FIELD OF THE INVENTION

This disclosure relates to translating cylinder-head-sector (CHS) addressing of digital data written to or read from a DASD so as to accommodate DASD storage capacities in excess of the approximately five hundred twenty eight megabyte capacity limit imposed by Interrupt 13 design.

SUMMARY OF THE INVENTION

The invention here disclosed enables CHS addressing to satisfactorily address DASD having storage capacities in excess of the approximately five hundred twenty eight megabyte capacity limit imposed by Interrupt 13 design by using a control program functioning with a microprocessor and DASD for interrogating said DASD as to the number of cylinders present, determining whether such number of cylinders exceeds one thousand twenty four, and in the event that it does repeatedly dividing the number of cylinders present by two until the quotient is less than one thousand twenty four while registering the number of times such dividing is repeated, then establishing a first reference frame for cylinder-head-sector data which has a range of up to one thousand twenty four cylinders and a range of up to two hundred fifty six heads, establishing a second reference frame for cylinder-head-sector data which has range of more than one thousand twenty four cylinders and a range of up to the number of heads present in the DASD, and translating storage address digital data exchanged between the first and second reference frames to enable the exchange of data with the full storage capacity of said DASD. Translation is accomplished using the number of times dividing of the number of cylinders present by two was repeated.

BRIEF DESCRIPTION OF THE DRAWING(S)

Some of the purposes of the invention having been stated, other purposes will appear as the description proceeds, when taken in connection with the accompanying drawings, in which.

Figure 1:
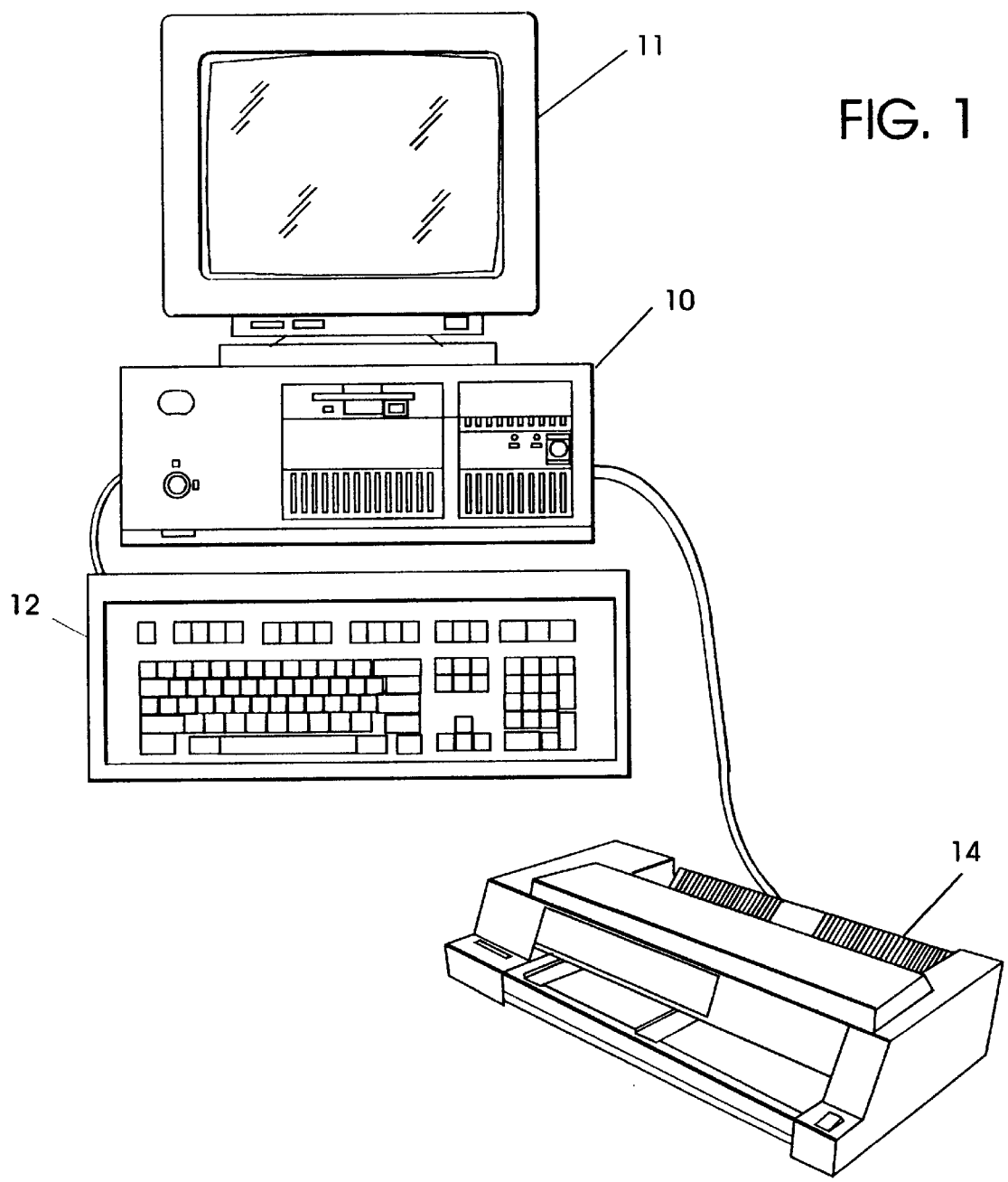
FIG. 1 is a perspective view of a personal computer embodying this invention.
Figure 2:
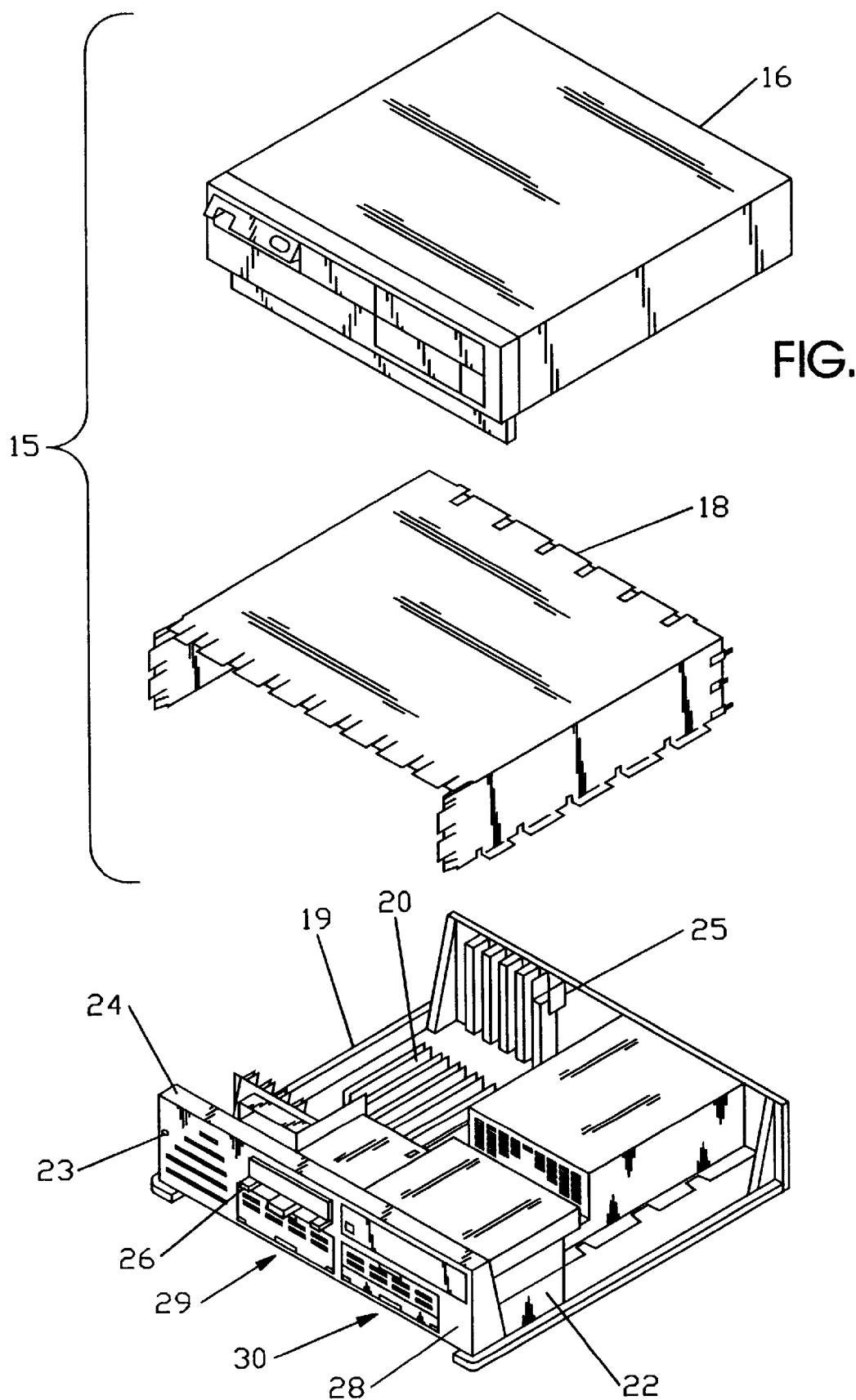
FIG. 2 is an exploded perspective view of certain elements of the personal computer of FIG. 1 including a chassis, a cover, a direct access storage device (DASD) and a planar board and illustrating certain relationships among those elements.
Figure 4:
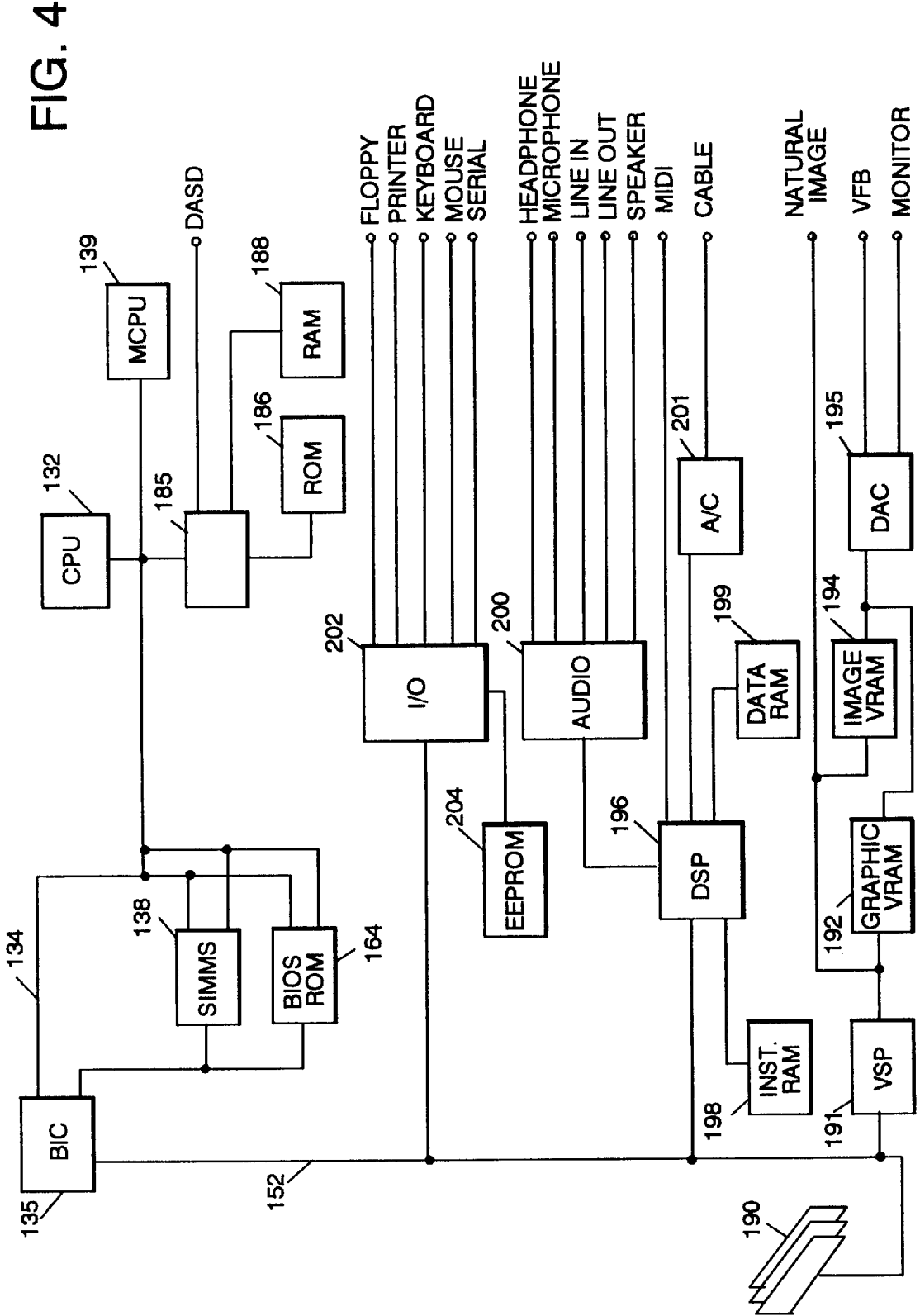
Figure 5:
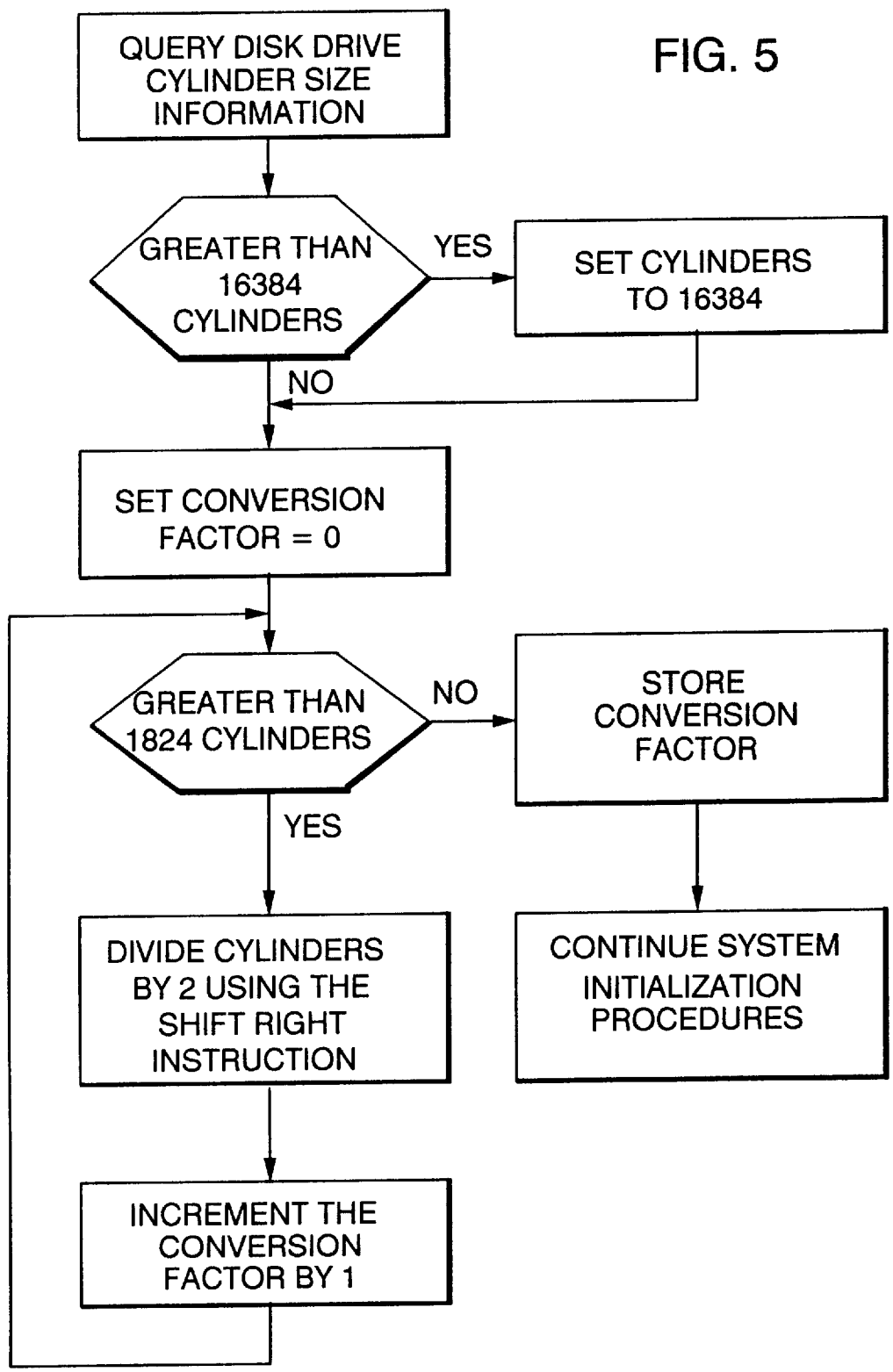
Figure 6:
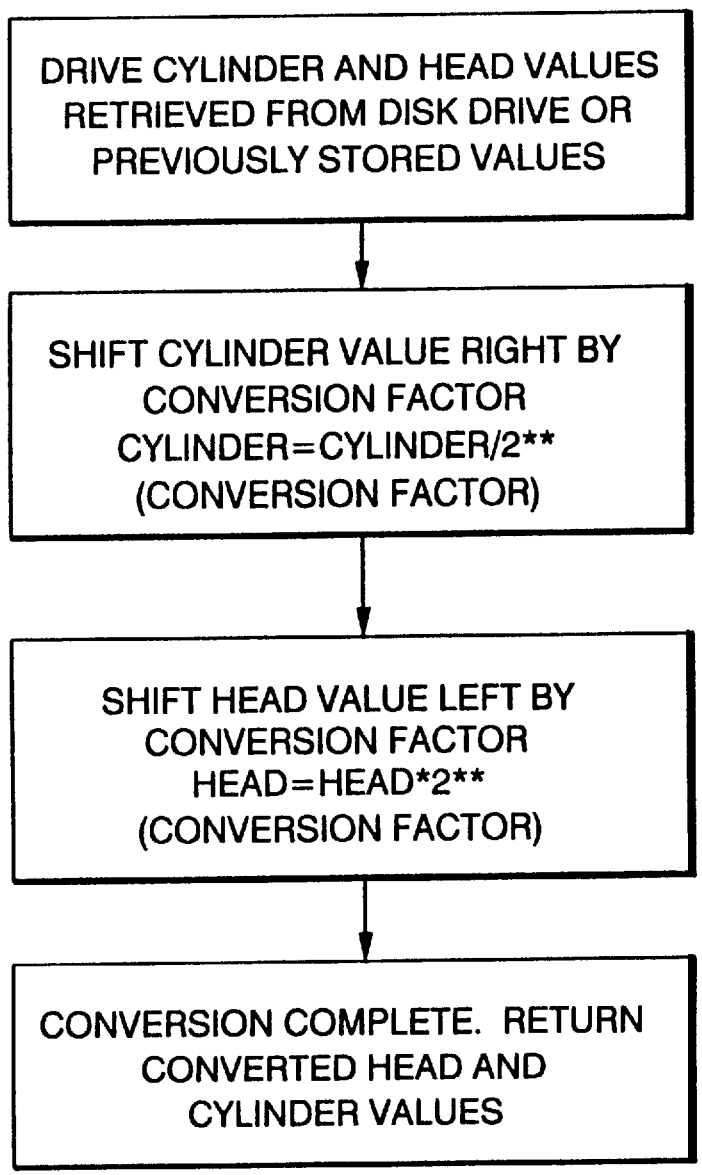
Figure 7:
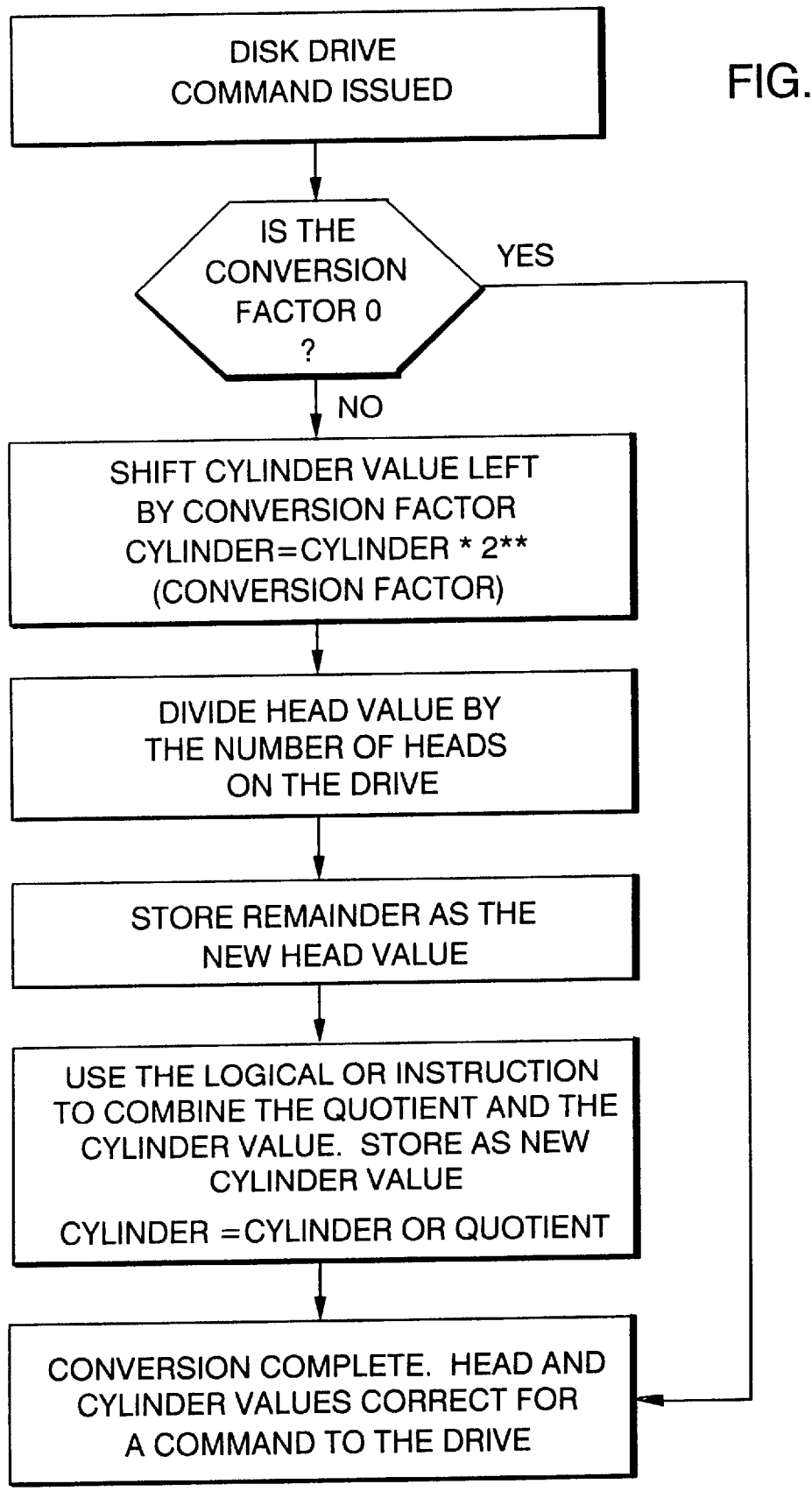

FIG. 3 , comprising of 3A and 3B, is a schematic view of certain components of the personal computer of FIGS. 1 and 2;

FIG. 4 is a schematic view of an alternate arrangement of components of the personal computer of FIGS. 1 and 2, illustrating another organization of such components;

FIG. 5 is a flow chart of certain operational steps followed in implementing the present invention using the personal computers of FIGS. 1 through 4;

FIG. 6 is a flow chart of certain other operational steps followed in implementing the present invention using the personal computers of FIGS. 1 through 4; and FIG. 7 is a flow chart of still other operational steps followed in implementing the present invention using the personal computers of FIGS. 1 through 4.

DESCRIPTION OF THE ILLUSTRATIVE EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, a personal computer system embodying the present invention is there shown and generally indicated at 10 (FIG. 1). As mentioned hereinabove, the computer 10 may have an associated monitor 11, keyboard 12 and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a multilayer planar or motherboard 20 which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base 22, a front panel 24, and a rear panel 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch). One fixed disc DASD is indicated at 90 in FIG. 1, and capable of receiving, storing and delivering data as is generally known.

Prior to relating the above structure to the present invention, a summary of the operation in general of the personal computer system 10 may merit review. Referring to FIG. 3, there is shown a block diagram of a first type of personal computer system illustrating the various components of the computer system such as the system 10 in accordance with the present invention, including components mounted on the planar 20 and the connection of the planar to the I/O slots and other hardware of the personal computer system. Connected to the planar is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80386 which is sold by INTEL.

While the present invention is described hereinafter with particular reference to the system block diagrams of FIGS. 3 and 4, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and further buffers 51, 68. The system bus 44 is further connected to the bus control and timing unit 35 and a DMA unit 48. The DMA unit 48 is comprised of a central arbitration unit 49 and DMA controller 50. One buffer 51 provides an interface between the system bus 44 and an optional feature bus such as the ISA bus 52. Connected to the bus 52 are a plurality of I/O slots 54 for receiving ISA adapter cards which may be further connected to an I/O device or memory.

An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexor 60, and a data buffer 61. The memory control unit 36 is further connected to a random access memory as represented by the RAM module 38. The memory controller 36 includes the logic for mapping addresses to and from the microprocessor 32 to particular areas of RAM 38. The memory controller 36 also generates a ROM select signal (ROMSEL), that is used to enable or disable ROM 64. While the microcomputer system is shown with a basic 1 megabyte RAM module, it is understood that additional memory can be interconnected as represented in FIG. 3 by the optional memory modules 65 through 67.

A latch buffer 68 is coupled between the system bus 44 and a planar I/O bus 69. The planar I/O bus 69 includes address, data, and control components respectively. Coupled along the planar I/O bus 69 are a variety of I/O adapters and other components such as the display adapter 70 (which is used to drive the monitor 11), a CMOS clock 72, nonvolatile CMOS RAM 74 herein after referred to as NVRAM, a RS232 adapter 76, a parallel adapter 78, a plurality of timers 80, a diskette adapter 56, an interrupt controller 84, and a read only memory 64. The read only memory 64 stores the BIOS control program that is used to interface between the I/O devices and the operating system of the microprocessor 32. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e. BIOS is executed out of RAM).

The clock 72 is used for time of day calculations and the NVRAM is used to store system configuration data. That is, the NVRAM will contain values which describe the present configuration of the system. For example, NVRAM contains information describing the capacity of a fixed disk or diskette, the type of display, the amount of memory, time, date, etc. Of particular importance, NVRAM will contain data (can be one bit) which is used by memory controller 36 to determine whether BIOS is run out of ROM or RAM and whether to reclaim RAM intended to be used by BIOS RAM. Furthermore, these data are stored in NVRAM whenever a special configuration program, such as SET Configuration, is executed. The purpose of the SET Configuration program is to store values characterizing the configuration of the system to NVRAM.

As mentioned hereinabove, the computer has a cover indicated generally at 15 which cooperates with the chassis 19 in forming an enclosed, shielded volume for containing the above identified components of the microcomputer. The cover preferably is formed with an outer decorative cover member 16 which is a unitary molded component made of a moldable synthetic material and a metallic thin sheet liner 18 formed to conform to the configuration of the decorative cover member. However, the cover can be made in other known ways and the utility of this invention is not limited to enclosures of the type described.

An alternate arrangement for an ISA personal computer is shown in FIG. 4, where is shown a block diagram of a personal computer system illustrating various components of an alternate arrangement for the computer system such as the system 10 in accordance with the present invention. In identifying components shown in FIG. 4 which are functionally similar to components described above with reference to FIG. 3, like reference characters of a one hundred order of magnitude may be used. By way of example, the microprocessor 132 shown in FIG. 4 is generally similar in function to the microprocessor 32 of FIG. 3. The CPU 132 is connected by a high speed CPU local bus 134 to a bus interface control unit 135, to volatile random access memory (RAM) 138 here shown as Single Inline Memory Modules (SIMMs) and to BIOS ROM 164 in which is stored instructions for basic input/output operations to the CPU 132. The BIOS ROM 164 includes the BIOS that is used to interface between the I/O devices and the operating system of the microprocessor 132. Instructions stored in ROM 164 can be copied into RAM 138 to decrease the execution time of BIOS.

The CPU local bus 134 (comprising data, address and control components) also provides for the connection of the microprocessor 132 with a math coprocessor 139 and a DASD controller 185. The DASD controller 185 may, as is known to persons skilled in the arts of computer design and operation, be connected or connectable with Read Only Memory (ROM) 186, RAM 188, and suitable external devices of a variety of types as facilitated by the I/O connection indicated to the right in the Figure.

The bus interface controller (BIC) 135 couples the CPU local bus 134 with an I/O bus 152. By means of the bus 152, the BIC 135 is coupled with an optional feature bus such as an ISA bus having a plurality of I/O slots for receiving adapter cards 190 which may be further connected to an I/O device or memory (not shown). The I/O bus 152 includes address, data, and control components.

Coupled along the I/O bus 152 are a variety of I/O components such as a video signal processor 191 which is associated with video RAM (VRAM) for storing graphic information (indicated at 192) and for storing image information (indicated at 194). Video signals exchanged with the processor 191 may be passed through a Digital to Analog Converter (DAC) 195 to a monitor or other display device. Provision is also made for connecting the VSP 191 directly with what is here referred to as a natural image input/output, which may take the form of a video recorder/player, camera, etc. The I/O bus 152 is also coupled with a Digital Signal Processor (DSP) 196 which has associated instruction RAM 198 and data RAM 199 available to store software instructions for the processing of signals by the DSP 196 and data involved in such processing. The DSP 196 provides for processing of audio inputs and outputs by the provision of an audio controller 200, and for handling of other signals by provision of an analog interface controller 201. Lastly, the I/O bus 152 is coupled with a input/output controller 202 with associated Electrical Erasable Programmable Read Only Memory (EEPROM) 204 by which inputs and outputs are exchanged with conventional peripherals including floppy disk drives, a printer or plotter 14, keyboard 12, a mouse or pointing device, and by means of a serial port.

In either of the alternative forms of personal computer organization described to this point, the DASD used may have a number of cylinders and heads which fall within the Interrupt 13 design expectations. That is, the number of cylinders may be 1024 or less and the number of heads may be 256 or less. In that event, then no difficulty is encountered in the normal operation of the personal computer system resulting in the interrogation of the DASD as to its characteristics, storing of that information as part of the system configuration, and operation of the system during normal use as is well known in the prior art. Such operation, with a DASD which in fact has sixteen heads (as is usual for an ATA DASD) results in a limitation on the memory capacity of the DASD available by CHS addressing to five hundred twenty eight million four hundred eighty two thousand three hundred four bytes of digital data.

It is an important distinguishing characteristic of the present invention that CHS addressing which is within the Interrupt 13 design expectations is used to address an ATA DASD which has a number of cylinders in excess of 1024, sixteen heads, and a storage capacity for digital data which exceeds five hundred twenty eight million four hundred eighty two thousand three hundred four bytes of digital data. This is accomplished, in accordance with this invention, by effecting a translation between two frames of reference for CHS addressing.

In accordance with this invention, a first frame of reference for CHS addressing is established which has a number of cylinders which exceeds one thousand twenty four and a number of heads which is reflective of the actual number of heads found in the drive to be attached and addressed. As has been expressed, that number is typically sixteen heads in drives of the type commonly encountered at the time this invention has been embodied into physical, operating personal computer systems. However, the number of heads may be any predetermined number other than sixteen which may be selected and used by a DASD designer. The first frame of reference corresponds to the physical characteristics of the DASD to be used.

A second frame of reference for CHS addressing is also established, with the second frame having a number of cylinders and heads which fits with the Interrupt 13 design assumptions. That is, the second frame of reference has no more than 1024 cylinders and no more than 256 heads.

The present invention contemplates that CHS addressing data exchanged between the two frames of reference is translated to enable the exchange of data with the full storage capacity of the attached DASD. This translation is accomplished by establishing a particular relationship between the addressing in the first frame of reference and that in the second frame of reference.

The discussion which follows will address the manner of establishing the two frames of reference and accomplishing the translation between them. However, as a preamble, it is to be noted that the establishing and translating is contemplated as being useful with a variety of forms of DASD control which can be encountered. More specifically, the invention to be described has utility with DASD which is controlled through a controller card mounted in an I/O bus connector; with DASD which is of the IDE type; and with DASD which is addressed directly under the control of the system CPU 32, 132. It is to be noted that in each instance there is a microprocessor which functions in connection with the CHS addressing. In the instance of a DASD/controller card combination, the addressing microprocessor is commonly located on the card. With an IDE DASD, the addressing microprocessor is commonly integrated into the DASD. With a DASD controlled directly from the system CPU, the microprocessor is the system CPU. Further, in each instance there is a control program which is stored accessibly to the microprocessor, loaded into the microprocessor, and which cooperates with the microprocessor in accomplishing the addressing. That control program often can be, and is here, referred to as a basic input/output system, or a portion of such a system, also known as a BIOS. BIOS for a personal computer system can comprise the primary BIOS referred to above in the discussion of the system organization illustrated in FIGS. 3 and 4; or an option card BIOS portion such as may be stored on an option card such as a DASD controller; or a device BIOS such as may be stored as a part of an IDE DASD; or a portion of the primary BIOS as earlier described. The present invention contemplates that the control program mentioned hereinafter can be any of these various types.

In any such event, a system as contemplated by this invention has a rotating media direct access storage device (DASD) 90 for receiving, storing and delivering digital data. The DASD has a first predetermined number of cylinders and a second predetermined number of heads, each of the cylinders being divided into a third predetermined number of sectors. As will be understood, the heads exchange digital data with the sectors of the cylinders, writing to or reading from the sectors as directed by CHS addressing signals. In accordance with this invention the cylinders, heads, and sectors together define a storage capacity for the DASD in excess of five hundred twenty eight million four hundred eighty two thousand three hundred four bytes of digital data.

As indicated in the discussion above, the system has a microprocessor for processing digital data, with the microprocessor controlling the exchange of digital data with the DASD using cylinder-head-sector storage address data. The system also has a control program accessible to the microprocessor for controlling the flow of digital data to and from the DASD. In operation, the microprocessor accesses the control program, loads the control program and, operating under the control of said control program, performs a sequence of operations which enable the exchange of data with the full storage capacity of the DASD.

The operations performed include establishing the first and second frames of reference mentioned above and then translating between them. Before establishing the frames of reference, the system determines a conversion factor to be applied, following steps as shown in FIG. 5. Those steps comprise interrogating as to the number of cylinders provided in the DASD, then determining whether the number of cylinders is greater than sixteen thousand three hundred eighty four. The latter number is the maximum which can be addressed in the specific implementation here described, and may vary should the implementation vary from what is here described in detail. If the number is greater, then the number sixteen thousand three hundred eighty four is used for the next following steps. If not, then the number reported is used. The next step is to set a register to be used to store the conversion factor to a zero registered value. A determination is then made as to whether the number of cylinders is greater than one thousand twenty four, the upper limit number implied by Interrupt 13 design as described above. If the number is equal to or less than one thousand twenty four, then the conversion factor register is allowed to remain at zero count and no conversion will be necessary. If greater than one thousand twenty four, then the number of cylinders is divided by two. A preferred manner of accomplishing the division is by using a "Shift Right" instruction. The division is followed by incrementing the conversion factor register by a count of one. The process then returns to interrogating as to the number of cylinders identified as the quotient of the preceding division, dividing the quotient number of cylinders by two if greater than one thousand twenty four, incrementing the conversion factor register by one, and repeating the division/incrementing until the quotient number of cylinders is less than one thousand twenty four. At such time as the quotient number is less than one thousand twenty four, the count stored in the register is the conversion factor (herein also identified as "N") to be later applied. Where appropriate, the conversion factor may be stored as part of the system configuration data held in NVRAM.

With determination of the conversion factor, the frames of reference mentioned above may be set. One such frame is set by a procedure to get the drive parameters of the DASD, as illustrated in FIG. 6. As there shown, cylinder and head values are retrieved from the DASD or from previously stored values by interrogation. The cylinder number is then converted using the conversion factor, by dividing the cylinder number by two (the divisor in the previously described process of determining the conversion factor) raised to the power of the conversion factor. Another way to explain this conversion is that the cylinder number is shifted right by the conversion factor. Expressed algorithmically, $$\text{Converted Cylinder} = \text{Cylinder}/2^N$$

The head number is then converted using the conversion factor, by multiplying the head number by two raised to the power of the conversion factor (or shifting the head number left by the conversion factor). Expressed algorithmically, $$\text{Converted Head} = \text{Head} \times 2^N$$

At this point, the conversion is complete, and the converted cylinder and head numbers are returned for use in CHS addressing of the DASD.

It is to be noted that a DASD has in integer number of cylinders and cannot have fractional cylinders. Any fractional cylinder which would otherwise appear to have been created in conversion is discarded. That is, a drive with two thousand one cylinders and sixteen heads will be reported as having one thousand cylinders and thirty two heads. The half of a BIOS cylinder is "lost". If such a DASD is addressed through a BIOS using the Interrupt 13 design restraints at cylinder 0 head 20, the physical DASD is accessed at cylinder 1 head 4.

As a working example, assume that a system is provided with a DASD which has two thousand cylinders and sixteen heads for a total storage capability of ten billion, one hundred four million, one hundred ninety two thousand bytes of digital data (2000×16×63×512). The conversion factor becomes one (one division of 2000 by 2 leaves a quotient of 1000, which is less than 1024).

The second reference frame is established by the DASD itself, as having a range of more than one thousand twenty four cylinders and a range of up to a predetermined number of heads, namely the number provided on the physical drive. In the instance given above (as is the case for most ATA DASD) the number is sixteen.

Translation between the two reference frames occurs as illustrated in FIG. 7, through the operation of the control program with the microprocessor as described above. More particularly, translation of storage address digital data exchanged between the first and second reference frames to enable the exchange of data with the full storage capacity of said DASD is accomplished using the number (N) of times dividing of the number of cylinders by two was repeated. In pursuing such translation, the first inquiry is of the stored data, to determine whether the stored conversion factor is other than zero. If it is zero, then no conversion is required and CHS addressing proceeds as contemplated by the original Interrupt 13 design. If it is greater than zero, then the cylinder number in the drive command is multiplied by two raised to the power of the conversion factor, N. Expressed algorithmically, $$\text{Translated Cylinder} = \text{Converted Cylinder} \times 2^N$$

The converted head number is then divided by the number of heads physically present in the DASD, and the remainder after such division is identified as the translated head number. The quotient of this division is then logically "OR"ed with the translated cylinder number and identified as the addressed cylinder number.

As indicated above, such determination of a conversion factor, conversion and translation can occur either as a function of the system BIOS in cooperation with the system CPU; as a function of a controller card BIOS in cooperation with a controller microprocessor; or as a function of an IDE BIOS in cooperation with an IDE microprocessor. In all instances, the effect of the translation is the same: a CHS address in a first frame of reference which meets the restraints of Interrupt 13 design in the ISA BIOS is translated to a CHS address in a second frame of reference which meets the physical characteristics of a DASD which is otherwise outside the restraints of Interrupt 13 design in the ISA BIOS.

In the drawings and specifications there has been set forth a preferred embodiment of the invention and, although specific terms are used, the description thus given uses terminology in a generic and descriptive sense only and not for purposes of limitation.

What is claimed is:

1. A computer system comprising:

a rotating media direct access storage device (DASD) for receiving, storing and delivering digital data, said DASD having a first predetermined number of cylinders and a second predetermined number of heads, each of said cylinders being divided into a third predetermined number of sectors and said heads exchanging digital data with said sectors of said cylinders, said DASD having the location of digital data therein defined using cylinder-head-sector storage address data, said cylinders and said heads and said sectors together defining storage capacity for said device in excess of five hundred twenty eight million four hundred eighty two thousand three hundred four bytes of digital data, a microprocessor for processing digital data, said microprocessor controlling the exchange of digital data with said DASD using cylinder-head-sector storage address data, and a control program accessible to said microprocessor for controlling the flow of digital data to and from said DASD, said microprocessor accessing said control program and loading said control program and operating under the control of said control program, said control program functioning with said microprocessor and said DASD for interrogating said DASD as to said first predetermined number of cylinders, for determining that said first predetermined number of cylinders exceeds one thousand twenty four, for repeatedly dividing said first predetermined number by two until the quotient is less than one thousand twenty four while registering the number (N) of times such dividing is repeated, for establishing a first reference frame for cylinder-head-sector data, said first reference frame having a range of up to one thousand twenty four cylinders and a range of up to two hundred fifty six heads, for establishing a second reference frame for cylinder-head-sector data, said second reference frame having a range of more than one thousand twenty four cylinders and a range of up to said second predetermined number of heads, and for translating storage address digital data exchanged between said first and second reference frames to enable the exchange of data with the full storage capacity of said DASD, said translating being accomplished using the number (N) of times dividing of said first predetermined number by two was repeated.

2. A computer system according to claim 1 further comprising a storage memory element for receiving and storing said control program, said storage memory element being operatively connected with said microprocessor for accessing of said control program by said microprocessor.

3. A computer system according to claim 2 wherein said storage memory element comprises a read only memory device.

4. A computer system according to claim 2 wherein said storage memory element comprises a non-volatile random access memory device and further wherein said computer system comprises an electrical energy source operatively connected with said non-volatile random access memory device for energizing said non-volatile random access memory device and for maintaining storage of said control program therein.

5. A computer system according to claim 1 wherein said DASD is an integrated drive electronics DASD and further wherein said microprocessor and said control program are integrated into said DASD.

6. A computer system according to claim 1 further comprising a motherboard for supporting and connecting electrical components of said computer system, an input/output channel defined in said motherboard and comprising a channel connector, and a DASD controller card mounted in said channel connector, and further wherein said microprocessor is mounted on said controller card and said control program is stored on said controller card for accessing by said microprocessor.

7. A computer system according to claim 1 further comprising a motherboard for supporting and connecting electrical components of said computer system, and further wherein said microprocessor is mounted on said motherboard and said control program is stored on said motherboard for accessing by said microprocessor.

8. A computer system according to claim 7 wherein said microprocessor is the system processor for said computer system, said computer system further comprises a basic input/output system (BIOS) program, and said control program is embedded within said BIOS program.

9. A computer system according to claim 1 wherein said control program functioning with said microprocessor and said DASD performs the function of translating CHS storage address digital data by deriving cylinder and head numbers for the second reference frame by multiplying a cylinder number from the first reference frame by $2^N$ and dividing a head number from the first reference frame by the second predetermined number of heads.

10. A computer system according to claim 1 wherein said control program functioning with said microprocessor and said DASD performs the function of translating CHS storage address digital data by deriving cylinder and head numbers for the first reference frame by dividing a cylinder number from the second reference frame by $2^N$ and multiplying a head number from the second reference frame by $2^N$.

11. A computer system comprising:

an integrated drive electronics (IDE) rotating media direct access storage device (DASD) for receiving, storing and delivering digital data, said IDE DASD having a first predetermined number of cylinders and a second predetermined number of heads, each of said cylinders being divided into a third predetermined number of sectors and said heads exchanging digital data with said sectors of said cylinders, said IDE DASD having the location of digital data therein defined using cylinder-head-sector storage address data, said cylinders and said heads and said sectors together defining storage capacity for said device in excess of five hundred twenty eight million four hundred eighty two thousand three hundred four bytes of digital data, a microprocessor for processing digital data, said microprocessor being integrated into said IDE DASD and controlling the exchange of digital data with said IDE DASD using cylinder-head-sector storage address data, and a control program integrated into said IDE DASD and accessible to said microprocessor for controlling the flow of digital data to and from said IDE DASD, said microprocessor accessing said control program and loading said control program and operating under the control of said control program, said control program functioning with said microprocessor and said DASD for interrogating said DASD as to said first predetermined number of cylinders, for determining that said first predetermined number of cylinders exceeds one thousand twenty four, for repeatedly dividing said first predetermined number by two until the quotient is less than one thousand twenty four while registering the number (N) of times such dividing is repeated, for establishing a first reference frame for cylinder-head-sector data, said first reference frame having a range of up to one thousand twenty four cylinders and a range of up to two hundred fifty six heads, for establishing a second reference frame for cylinder-head-sector data, said second reference frame having a range of more than one thousand twenty four cylinders and a range of up to said second predetermined number of heads, and for translating storage address digital data exchanged between said first and second reference frames to enable the exchange of data with the full storage capacity of said DASD, said translating being accomplished using the number (N) of times dividing of said first predetermined number by two was repeated.

12. A computer system according to claim 11 further comprising a storage memory element for receiving and storing said control program, said storage memory element being integrated into said IDE DASD and operatively connected with said microprocessor for accessing of said control program by said microprocessor.

13. A computer system according to claim 12 wherein said storage memory element comprises a read only memory device.

14. A computer system according to claim 12 wherein said storage memory element comprises a non-volatile random access memory device and further wherein said computer system comprises an electrical energy source operatively connected with said non-volatile random access memory device for energizing said non-volatile random access memory device and for maintaining storage of said control program therein.

15. A computer system according to claim 11 wherein said control program functioning with said microprocessor and said DASD performs the function of translating CHS storage address digital data by deriving cylinder and head numbers for the second reference frame by multiplying a cylinder number from the first reference frame by $2^N$ and dividing a head number from the first reference frame by the second predetermined number of heads.

16. A computer system according to claim 11 wherein said control program functioning with said microprocessor and said DASD performs the function of translating CHS storage address digital data by deriving cylinder and head numbers for the first reference frame by dividing a cylinder number from the second reference frame by $2^N$ and multiplying a head number from the second reference frame by $2^N$.

17. A computer system comprising:
a motherboard for supporting and connecting electrical components of said computer system,
an input/output channel defined in said motherboard and comprising a channel connector,
a rotating media direct access storage device (DASD) for receiving, storing and delivering digital data, said DASD having a first predetermined number of cylinders and a second predetermined number of heads, each of said cylinders being divided into a third predetermined number of sectors and said heads exchanging digital data with said sectors of said cylinders,
said DASD having the location of digital data therein defined using cylinder-head-sector storage address data,
said cylinders and said heads and said sectors together defining storage capacity for said device in excess of five hundred twenty eight million four hundred eighty two thousand three hundred four bytes of digital data,
a DASD controller card mounted in said channel connector,
a microprocessor for processing digital data, said microprocessor being mounted on said DASD controller card and controlling the exchange of digital data with said DASD using cylinder-head-sector storage address data, and
a control program stored on said controller card and accessible to said microprocessor for controlling the flow of digital data to and from said DASD,
said microprocessor accessing said control program and loading said control program and operating under the control of said control program,
said control program functioning with said microprocessor and said DASD
for interrogating said DASD as to said first predetermined number of cylinders,
for determining that said first predetermined number of cylinders exceeds one thousand twenty four,
for repeatedly dividing said first predetermined number by two until the quotient is less than one thousand twenty four while registering the number (N) of times such dividing is repeated,
for establishing a first reference frame for cylinder-head-sector data, said first reference frame having a range of up to one thousand twenty four cylinders and a range of up to two hundred fifty six heads,
for establishing a second reference frame for cylinder-head-sector data, said second reference frame having a range of more than one thousand twenty four cylinders and a range of up to said second predetermined number of heads, and
for translating storage address digital data exchanged between said first and second reference frames to enable the exchange of data with the full storage capacity of said DASD, said translating being accomplished using the number (N) of times dividing of said first predetermined number by two was repeated.

18. A computer system according to claim 17 further comprising a storage memory element for receiving and storing said control program, said storage memory element being mounted on said DASD controller card and operatively connected with said microprocessor for accessing of said control program by said microprocessor.

19. A computer system according to claim 18 wherein said storage memory element comprises a read only memory device.

20. A computer system according to claim 18 wherein said storage memory element comprises a non-volatile random access memory device and further wherein said computer system comprises an electrical energy source operatively connected with said non-volatile random access memory device for energizing said non-volatile random access memory device and for maintaining storage of said control program therein.

21. A computer system according to claim 17 wherein said control program functioning with said microprocessor and said DASD performs the function of translating CHS storage address digital data by deriving cylinder and head numbers for the second reference frame by multiplying a cylinder number from the first reference frame by $2^N$ and dividing a head number from the first reference frame by the second predetermined number of heads.

22. A computer system according to claim 17 wherein said control program functioning with said microprocessor and said DASD performs the function of translating CHS storage address digital data by deriving cylinder and head numbers for the first reference frame by dividing a cylinder number from the second reference frame by $2^N$ and multiplying a head number from the second reference frame by $2^N$.

23. A computer system comprising:
a motherboard for supporting and connecting electrical components of said computer system,
a rotating media direct access storage device (DASD) for receiving, storing and delivering digital data, said DASD having a first predetermined number of cylinders and a second predetermined number of heads, each of said cylinders being divided into a third predetermined number of sectors and said heads exchanging digital data with said sectors of said cylinders,
said DASD having the location of digital data therein defined using cylinder-head-sector storage address data,
said cylinders and said heads and said sectors together defining storage capacity for said device in excess of five hundred twenty eight million four hundred eighty two thousand three hundred four bytes of digital data,
a microprocessor for processing digital data, said microprocessor being mounted on said motherboard and controlling the exchange of digital data with said DASD using cylinder-head-sector storage address data, and a control program stored on said motherboard and accessible to said microprocessor for controlling the flow of digital data to and from said DASD, said microprocessor accessing said control program and loading said control program and operating under the control of said control program, said control program functioning with said microprocessor and said DASD for interrogating said DASD as to said first predetermined number of cylinders, for determining that said first predetermined number of cylinders exceeds one thousand twenty four, for repeatedly dividing said first predetermined number by two until the quotient is less than one thousand twenty four while registering the number (N) of times such dividing is repeated, for establishing a first reference frame for cylinder-head-sector data, said first reference frame having a range of up to one thousand twenty four cylinders and a range of up to two hundred fifty six heads, for establishing a second reference frame for cylinder-head-sector data, said second reference frame having a range of more than one thousand twenty four cylinders and a range of up to said second predetermined number of heads, and for translating storage address digital data exchanged between said first and second reference frames to enable the exchange of data with the full storage capacity of said DASD, said translating being accomplished using the number (N) of times dividing of said first predetermined number by two was repeated.

24. A computer system according to claim 23 further comprising a storage memory element for receiving and storing said control program, said storage memory element being mounted on said DASD controller card and operatively connected with said microprocessor for accessing of said control program by said microprocessor.

25. A computer system according to claim 24 wherein said storage memory element comprises a read only memory device.

26. A computer system according to claim 24 wherein said storage memory element comprises a non-volatile random access memory device and further wherein said computer system comprises an electrical energy source operatively connected with said non-volatile random access memory device for energizing said non-volatile random access memory device and for maintaining storage of said control program therein.

27. A computer system according to claim 24 wherein said microprocessor is the system processor for said computer system, said computer system further comprises a basic input/output system (BIOS) program, and said control program is embedded within said BIOS program.

28. A computer system according to claim 23 wherein said control program functioning with said microprocessor and said DASD performs the function of translating CHS storage address digital data by deriving cylinder and head numbers for the second reference frame by multiplying a cylinder number from the first reference frame by $2^N$ and dividing a head number from the first reference frame by the second predetermined number of heads.

29. A computer system according to claim 23 wherein said control program functioning with said microprocessor and said DASD performs the function of translating CHS storage address digital data by deriving cylinder and head numbers for the first reference frame by dividing a cylinder number from the second reference frame by $2^N$ and multiplying a head number from the second reference frame by $2^N$.

30. A personal computer system having a high speed system processor compatible with application programs and operating system software designed to execute on slower speed system processors, said personal computer system comprising:

a high speed microprocessor for processing digital data, said microprocessor having a real and protected mode of operation and being electrically coupled to a high speed data bus;

non-volatile memory electrically coupled to a slower speed data bus;

bus controller for providing communications between the high speed data bus and the slower speed data bus;

volatile memory electrically coupled to the high speed data bus;

a memory controller electrically coupled to said volatile memory and said non-volatile memory, said memory controller regulating communications among said volatile memory and said non-volatile memory and said high speed microprocessor;

a rotating media direct access storage device (DASD) for receiving, storing and delivering digital data, said DASD having a first predetermined number of cylinders and a second predetermined number of heads, each of said cylinders being divided into a third predetermined number of sectors and said heads exchanging digital data with said sectors of said cylinders, said DASD having the location of digital data therein defined using cylinder-head-sector storage address data, said cylinders and said heads and said sectors together defining storage capacity for said device in excess of five hundred twenty eight million four hundred eighty two thousand three hundred four bytes of digital data;

said microprocessor controlling the exchange of digital data with said DASD using cylinder-head-sector storage address data, and a control program accessible to said microprocessor for controlling the flow of digital data to and from said DASD, said microprocessor accessing said control program and loading said control program and operating under the control of said control program, said control program functioning with said microprocessor and said DASD for interrogating said DASD as to said first predetermined number of cylinders, for determining that said first predetermined number of cylinders exceeds one thousand twenty four, for repeatedly dividing said first predetermined number by two until the quotient is less than one thousand twenty four while registering the number (N) of times such dividing is repeated, for establishing a first reference frame for cylinder-head-sector data, said first reference frame having a range of up to one thousand twenty four cylinders and a range of up to two hundred fifty six heads, for establishing a second reference frame for cylinder-head-sector data, said second reference frame having a range of more than one thousand twenty four cylinders and a range of up to said second predetermined number of heads, and for translating storage address digital data exchanged between said first and second reference frames to enable the exchange of data with the full storage capacity of said DASD, said translating being accomplished using the number (N) of times dividing of said first predetermined number by two was repeated.

31. A computer system according to claim 30 wherein said control program is stored in said non-volatile memory.

32. A computer system according to claim 31 wherein said non-volatile memory comprises a read only memory device.

33. A computer system according to claim 31 wherein non-volatile memory comprises a non-volatile random access memory device and further wherein said computer system comprises an electrical energy source operatively connected with said non-volatile random access memory device for energizing said non-volatile random access memory device and for maintaining storage of said control program therein.

34. A computer system according to claim 30 wherein said control program functioning with said microprocessor and said DASD performs the function of translating CHS storage address digital data by deriving cylinder and head numbers for the second reference frame by multiplying a cylinder number from the first reference frame by $2^N$ and dividing a head number from the first reference frame by the second predetermined number of heads.

35. A computer system according to claim 30 wherein said control program functioning with said microprocessor and said DASD performs the function of translating CHS storage address digital data by deriving cylinder and head numbers for the first reference frame by dividing a cylinder number from the second reference frame by $2^N$ and multiplying a head number from the second reference frame by $2^N$.

36. A personal computer system having a high speed system processor compatible with application programs and operating system software designed to execute on slower speed system processors, said personal computer system comprising:

a high speed microprocessor for processing digital data, said microprocessor having a real and protected mode of operation and being electrically coupled to a high speed data bus;

non-volatile memory electrically coupled to a slower speed data bus;

bus controller for providing communications between the high speed data bus and the slower speed data bus;

volatile memory electrically coupled to the high speed data bus;

a memory controller electrically coupled to said volatile memory and said non-volatile memory, said memory controller regulating communications among said volatile memory and said non-volatile memory and said high speed microprocessor;

an integrated drive electronics (IDE) rotating media direct access storage device (DASD) for receiving, storing and delivering digital data, said IDE DASD having a first predetermined number of cylinders and a second predetermined number of heads, each of said cylinders being divided into a third predetermined number of sectors and said heads exchanging digital data with said sectors of said cylinders, said IDE DASD having the location of digital data therein defined using cylinder-head-sector storage address data, said cylinders and said heads and said sectors together defining storage capacity for said device in excess of five hundred twenty eight million four hundred eighty two thousand three hundred four bytes of digital data, a second microprocessor for processing digital data, said second microprocessor being integrated into said IDE DASD and controlling the exchange of digital data with said IDE DASD using cylinder-head-sector storage address data, and a control program integrated into said IDE DASD and accessible to said second microprocessor for controlling the flow of digital data to and from said IDE DASD, said second microprocessor accessing said control program and loading said control program and operating under the control of said control program, said control program functioning with said microprocessor and said DASD for interrogating said DASD as to said first predetermined number of cylinders, for determining that said first predetermined number of cylinders exceeds one thousand twenty four, for repeatedly dividing said first predetermined number by two until the quotient is less than one thousand twenty four while registering the number (N) of times such dividing is repeated, for establishing a first reference frame for cylinder-head-sector data, said first reference frame having a range of up to one thousand twenty four cylinders and a range of up to two hundred fifty six heads, for establishing a second reference frame for cylinder-head-sector data, said second reference frame having a range of more than one thousand twenty four cylinders and a range of up to said second predetermined number of heads, and for translating storage address digital data exchanged between said first and second reference frames to enable the exchange of data with the full storage capacity of said DASD, said translating being accomplished using the number (N) of times dividing of said first predetermined number by two was repeated.

37. A computer system according to claim 36 further comprising a storage memory element for receiving and storing said control program, said storage memory element being integrated into said IDE DASD and operatively connected with said second microprocessor for accessing of said control program by said second microprocessor.

38. A computer system according to claim 37 wherein said storage memory element comprises a read only memory device.

39. A computer system according to claim 37 wherein said storage memory element comprises a non-volatile random access memory device and further wherein said computer system comprises an electrical energy source operatively connected with said non-volatile random access memory device for energizing said non-volatile random access memory device and for maintaining storage of said control program therein.

40. A computer system according to claim 36 wherein said control program functioning with said microprocessor and said DASD performs the function of translating CHS storage address digital data by deriving cylinder and head numbers for the second reference frame by multiplying a cylinder number from the first reference frame by $2^N$ and dividing a head number from the first reference frame by the second predetermined number of heads.

41. A computer system according to claim 36 wherein said control program functioning with said microprocessor and said DASD performs the function of translating CHS storage address digital data by deriving cylinder and head numbers for the first reference frame by dividing a cylinder number from the second reference frame by $2^N$ and multiplying a head number from the second reference frame by $2^N$.

42. A personal computer system having a high speed system processor compatible with application programs and operating system software designed to execute on slower speed system processors, said personal computer system comprising:

a motherboard for supporting and connecting electrical components of said computer system, a high speed microprocessor mounted on said motherboard for processing digital data, said microprocessor having a real and protected mode of operation and being electrically coupled to a high speed data bus;

non-volatile memory electrically coupled to a slower speed data bus;

an input/output channel defined in said motherboard and comprising a channel connector electrically coupled to the slower speed data bus, bus controller for providing communications between the high speed data bus and the slower speed data bus;

volatile memory electrically coupled to the high speed data bus;

a memory controller electrically coupled to said volatile memory and said non-volatile memory, said memory controller regulating communications among said volatile memory and said non-volatile memory and said high speed microprocessor;

a rotating media direct access storage device (DASD) for receiving, storing and delivering digital data, said DASD having a first predetermined number of cylinders and a second predetermined number of heads, each of said cylinders being divided into a third predetermined number of sectors and said heads exchanging digital data with said sectors of said cylinders, said DASD having the location of digital data therein defined using cylinder-head-sector storage address data, said cylinders and said heads and said sectors together defining storage capacity for said device in excess of five hundred twenty eight million four hundred eighty two thousand three hundred four bytes of digital data;

a DASD controller card mounted in said channel connector, a second microprocessor for processing digital data, said second microprocessor being mounted on said DASD controller card and controlling the exchange of digital data with said DASD using cylinder-head-sector storage address data, and a control program stored on said controller card and accessible to said microprocessor for controlling the flow of digital data to and from said DASD, said second microprocessor accessing said control program and loading said control program and operating under the control of said control program, said control program functioning with said second microprocessor and said DASD for interrogating said DASD as to said first predetermined number of cylinders, for determining that said first predetermined number of cylinders exceeds one thousand twenty four, for repeatedly dividing said first predetermined number by two until the quotient is less than one thousand twenty four while registering the number (N) of times such dividing is repeated, for establishing a first reference frame for cylinder-head-sector data, said first reference frame having a range of up to one thousand twenty four cylinders and a range of up to two hundred fifty six heads, for establishing a second reference frame for cylinder-head-sector data, said second reference frame having a range of more than one thousand twenty four cylinders and a range of up to said second predetermined number of heads, and for translating storage address digital data exchanged between said first and second reference frames to enable the exchange of data with the full storage capacity of said DASD, said translating being accomplished using the number (N) of times dividing of said first predetermined number by two was repeated.

43. A computer system according to claim 42 further comprising a storage memory element for receiving and storing said control program, said storage memory element being mounted on said DASD controller card and operatively connected with said microprocessor for accessing of said control program by said microprocessor.

44. A computer system according to claim 43 wherein said storage memory element comprises a read only memory device.

45. A computer system according to claim 43 wherein said storage memory element comprises a non-volatile random access memory device and further wherein said computer system comprises an electrical energy source operatively connected with said non-volatile random access memory device for energizing said non-volatile random access memory device and for maintaining storage of said control program therein.

46. A computer system according to claim 42 wherein said control program functioning with said microprocessor and said DASD performs the function of translating CHS storage address digital data by deriving cylinder and head numbers for the second reference frame by multiplying a cylinder number from the first reference frame by $2^N$ and dividing a head number from the first reference frame by the second predetermined number of heads.

47. A computer system according to claim 42 wherein said control program functioning with said microprocessor and said DASD performs the function of translating CHS storage address digital data by deriving cylinder and head numbers for the first reference frame by dividing a cylinder number from the second reference frame by $2^N$ and multiplying a head number from the second reference frame by $2^N$.

48. A method of operating a computer system which has a rotating media direct access storage device (DASD) for receiving, storing and delivering digital data, the DASD having a first predetermined number of cylinders and a second predetermined number of heads, each of the cylinders being divided into a third predetermined number of sectors and the heads exchanging digital data with the sectors of the cylinders, the DASD having the location of digital data therein defined using cylinder-head-sector (CHS) data, the cylinders and heads and sectors together defining storage capacity for the DASD in excess of five hundred twenty eight million four hundred eighty two thousand three hundred four bytes of digital data, a microprocessor for processing digital data, the microprocessor controlling the exchange of digital data with the DASD using CHS storage address data, and a control program accessible to the microprocessor for controlling the flow of digital data to and from the DASD, the method comprising the steps of:

accessing the control program with the microprocessor, loading the control program and, under the control of the control program, interrogating the DASD as to the first predetermined number of cylinders, determining that the first predetermined number of cylinders exceeds one thousand twenty four, repeatedly dividing the first predetermined number by two until the quotient is less than one thousand twenty four while registering as N the number (N) of times such dividing is repeated, establishing a first reference frame for CHS data, the first reference frame having a range of up to one thousand twenty four cylinders and a range of up to two hundred fifty six heads, establishing a second reference frame for CHS data, the second reference frame having a range of more than one thousand twenty four cylinders and a range of up to the second predetermined number of heads, and translating CHS storage address digital data exchanged between the first and second reference frames to enable the exchange of data with the full storage capacity of the DASD, said step of translating being accomplished using the number (N) of times dividing of the first predetermined number by two was repeated.

49. A method according to claim 48 wherein the step of translating CHS storage address digital data comprises the step of deriving cylinder and head numbers for the second reference frame by multiplying a cylinder number from the first reference frame by $2^N$ and dividing a head number from the first reference frame by $2^N$.

50. A method according to claim 48 wherein the step of translating CHS storage address digital data comprises the steps of deriving cylinder and head numbers for the first reference frame by dividing a cylinder number from the second reference frame by $2^N$ and multiplying a head number from the second reference frame by $2^N$.

51. A method according to claim 48 wherein the step of translating CHS storage address digital data comprises the steps of responding to issuance of a disk drive command by interrogating the value of N; then distinguishing between a value of N equal to zero and a value of N greater than zero; then responding to determination that N equals zero by passing the cylinder and head address untranslated;

responding to determination that N is greater than zero by multiplying the cylinder address by $2^N$ and dividing the head address by the second predetermined number and storing the remainder of the division of the head address by the second predetermined number as the translated head address; then combining the quotient of the division of the head address by the second predetermined number and the cylinder address by a logical OR operation and storing the result as the translated cylinder address; then passing passing the cylinder and head address as so translated.

52. A method of operating a computer system which has an integrated drive electronics (IDE) rotating media direct access storage device (DASD) for receiving, storing and delivering digital data, the IDE DASD having a first predetermined number of cylinders and a second predetermined number of heads, each of the cylinders being divided into a third predetermined number of sectors and the heads exchanging digital data with the sectors of the cylinders, the IDE DASD having the location of digital data therein defined using cylinder-head-sector (CHS) data, the cylinders and heads and sectors together defining storage capacity for the IDE DASD in excess of five hundred twenty eight million four hundred eighty two thousand three hundred four bytes of digital data, a microprocessor integrated into the electronics of the IDE DASD for processing digital data, the microprocessor controlling the exchange of digital data with the IDE DASD using CHS data, and a control program accessible to the microprocessor for controlling the flow of digital data to and from the IDE DASD, the method comprising the steps of:

accessing the control program with the microprocessor, loading the control program and, under the control of the control program, interrogating the DASD as to the first predetermined number of cylinders, determining that the first predetermined number of cylinders exceeds one thousand twenty four, repeatedly dividing the first predetermined number by two until the quotient is less than one thousand twenty four while registering as N the number of times such dividing is repeated, establishing a first reference frame for CHS data to be used externally of the IDE DASD, the first reference frame having a range of up to one thousand twenty four cylinders and a range of up to two hundred fifty six heads, establishing a second reference frame for CHS data to be used internally of the IDE DASD, the second reference frame having a range of more than one thousand twenty four cylinders and a range of up to the second predetermined number of heads, and translating CHS storage address digital data exchanged between the first and second reference frames to enable the exchange of data with the full storage capacity of the IDE DASD, said step of translating being accomplished using the number (N) of times dividing of the first predetermined number by two was repeated.

53. A method according to claim 52 wherein the step of translating CHS storage address digital data comprises the step of deriving cylinder and head numbers for the second reference frame by multiplying a cylinder number from the first reference frame by $2^N$ and dividing a head number from the first reference frame by the second predetermined number of heads.

54. A method according to claim 52 wherein the step of translating CHS storage address digital data comprises the steps of deriving cylinder and head numbers for the first reference frame by dividing a cylinder number from the second reference frame by $2^N$ and multiplying a head number from the second reference frame by $2^N$.

55. A method according to claim 52 wherein the step of translating CHS storage address digital data comprises the steps of responding to issuance of a disk drive command by interrogating the value of N; then distinguishing between a value of N equal to zero and a value of N greater than zero; then responding to determination that N equals zero by passing the cylinder and head address untranslated;

responding to determination that N is greater than zero by multiplying the cylinder address by $2^N$ and dividing the head address by the second predetermined number and storing the remainder of the division of the head address by the second predetermined number as the translated head address; then combining the quotient of the division of the head address by the second predetermined number and the cylinder address by a logical OR operation and storing the result as the translated cylinder address; then passing passing the cylinder and head address as so translated.

56. A method of operating a computer system which has a rotating media direct access storage device (DASD) for receiving, storing and delivering digital data, the DASD having a first predetermined number of cylinders and a second predetermined number of heads, each of the cylinders being divided into a third predetermined number of sectors and the heads exchanging digital data with the sectors of the cylinders, the DASD having the location of digital data therein defined using cylinder-head-sector (CHS) data, the cylinders and heads and sectors together defining storage capacity for the DASD in excess of five hundred twenty eight million four hundred eighty two thousand three hundred four bytes of digital data, a motherboard for supporting and connecting electrical components of the computer system, the motherboard defining an input/output channel which has a channel connector, a DASD controller card mounted in said channel connector and having a microprocessor for processing digital data, the microprocessor controlling the exchange of digital data with the DASD using CHS data, and a control program stored on the card accessibly to the microprocessor for controlling the flow of digital data to and from the DASD, the method comprising the steps of:

accessing the control program with the microprocessor, loading the control program and, under the control of the control program, interrogating the DASD as to the first predetermined number of cylinders, determining that the first predetermined number of cylinders exceeds one thousand twenty four, repeatedly dividing the first predetermined number by two until the quotient is less than one thousand twenty four while registering as N the number of times such dividing is repeated, establishing a first reference frame for CHS data to be used externally of the DASD controller card, the first reference frame having a range of up to one thousand twenty four cylinders and a range of up to two hundred fifty six heads, establishing a second reference frame for CHS data to be used between the DASD controller card and the DASD, the second reference frame having a range of more than one thousand twenty four cylinders and a range of up to the second predetermined number of heads, and translating CHS storage address digital data exchanged between the first and second reference frames to enable the exchange of data with the full storage capacity of the DASD, said step of translating being accomplished using the number (N) of times dividing of the first predetermined number by two was repeated.

57. A method according to claim 56 wherein the step of translating CHS storage address digital data comprises the step of deriving cylinder and head numbers for the second reference frame by multiplying a cylinder number from the first reference frame by $2^N$ and dividing a head number from the first reference frame by the second predetermined number of heads.

58. A method according to claim 56 wherein the step of translating CHS storage address digital data comprises the steps of deriving cylinder and head numbers for the first reference frame by dividing a cylinder number from the second reference frame by $2^N$ and multiplying a head number from the second reference frame by $2^N$.

59. A method according to claim 56 wherein the step of translating CHS storage address digital data comprises the steps of responding to issuance of a disk drive command by interrogating the value of N; then distinguishing between a value of N equal to zero and a value of N greater than zero; then responding to determination that N equals zero by passing the cylinder and head address untranslated;

responding to determination that N is greater than zero by multiplying the cylinder address by $2^N$ and dividing the head address by the second predetermined number and storing the remainder of the division of the head address by the second predetermined number as the translated head address; then combining the quotient of the division of the head address by the second predetermined number and the cylinder address by a logical OR operation and storing the result as the translated cylinder address; then passing passing the cylinder and head address as so translated.

60. A method of operating a computer system which has a rotating media direct access storage device (DASD) for receiving, storing and delivering digital data, the DASD having a first predetermined number of cylinders and a second predetermined number of heads, each of the cylinders being divided into a third predetermined number of sectors and the heads exchanging digital data with the sectors of the cylinders, the DASD having the location of digital data therein defined using cylinder-head-sector (CHS) data, the cylinders and heads and sectors together defining storage capacity for the DASD in excess of five hundred twenty eight million four hundred eighty two thousand three hundred four bytes of digital data, a motherboard for supporting and connecting electrical components of the computer system, the motherboard having a system microprocessor for processing digital data, the microprocessor controlling the exchange of digital data with the DASD using CHS data, and a control program stored on the motherboard accessibly to the microprocessor for controlling the flow of digital data to and from the DASD, the method comprising the steps of:

accessing the control program with the microprocessor, loading the control program and, under the control of the control program,
  interrogating the DASD as to the first predetermined number of cylinders,
  determining that the first predetermined number of cylinders exceeds one thousand twenty four,
  repeatedly dividing the first predetermined number by two until the quotient is less than one thousand twenty four while registering as N the number of times such dividing is repeated,
  establishing a first reference frame for CHS data to be used externally of the DASD, the first reference frame having a range of up to one thousand twenty four cylinders and a range of up to two hundred fifty six heads,
  establishing a second reference frame for CHS data to be used internally of the DASD, the second reference frame having a range of more than one thousand twenty four cylinders and a range of up to the second predetermined number of heads, and
  translating CHS storage address digital data exchanged between the first and second reference frames to enable the exchange of data with the full storage capacity of the DASD, said step
  of translating being accomplished using the number (N) of times
  dividing of the first predetermined number by two was repeated.

61. A method according to claim 60 wherein the step of translating CHS storage address digital data comprises the step of deriving cylinder and head numbers for the second reference frame by multiplying a cylinder number from the first reference frame by $2^N$ and dividing a head number from the first reference frame by the second predetermined number of heads.

62. A method according to claim 60 wherein the step of translating CHS storage address digital data comprises the steps of deriving cylinder and head numbers for the first reference frame by dividing a cylinder number from the second reference frame by $2^N$ and multiplying a head number from the second reference frame by $2^N$.

63. A method according to claim 60 wherein the step of translating CHS storage address digital data comprises the steps of
  responding to issuance of a disk drive command by interrogating the value of N; then
  distinguishing between a value of N equal to zero and a value of N greater than zero; then
  responding to determination that N equals zero by passing the cylinder and head address untranslated;
  responding to determination that N is greater than zero by multiplying the cylinder address by $2^N$ and dividing the head address by the second predetermined number and storing the remainder of the division of the head address by the second predetermined number as the translated head address; then combining the quotient of the division of the head address by the second predetermined number and the cylinder address by a logical OR operation and storing the result as the translated cylinder address; then passing the cylinder and head address as so translated.

* * * * *